(12) United States Patent
Tatsuda et al.

(10) Patent No.: US 6,202,296 B1
(45) Date of Patent: Mar. 20, 2001

(54) VEHICLE DOOR ASSEMBLY LINE

(75) Inventors: Kenji Tatsuda; Hioroaki Saito, both of Suzuka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/216,850

(22) Filed: Dec. 21, 1998

(30) Foreign Application Priority Data

Dec. 26, 1997 (JP) .................................................. 9-359813

(51) Int. Cl.$^7$ ...................................................... B23P 21/00
(52) U.S. Cl. ................................ 29/784; 29/791; 29/799; 29/824
(58) Field of Search .............................. 29/791, 783, 784, 29/799, 824

(56) References Cited

U.S. PATENT DOCUMENTS

| | | | | |
|---|---|---|---|---|
| 3,040,886 | * | 6/1962 | Svenson ................................... | 29/783 |
| 4,609,093 | | 9/1986 | Taketani et al. . | |
| 4,685,208 | * | 8/1987 | Sekiraku ................................. | 29/786 |
| 4,964,497 | * | 10/1990 | Bundo et al. ........................... | 29/824 |
| 4,965,929 | * | 10/1990 | Aligue .................................... | 29/822 |
| 5,297,483 | * | 3/1994 | Kakida et al. .......................... | 29/824 |
| 5,406,697 | * | 4/1995 | Busisi .................................... | 29/783 |
| 5,428,880 | * | 7/1995 | Tomioka et al. ........................ | 29/458 |

FOREIGN PATENT DOCUMENTS

| | | | | |
|---|---|---|---|---|
| 1-317882 | * | 12/1989 | (JP) .................................... | 29/564.1 |
| 2-65934 | * | 3/1990 | (JP) ........................................ | 29/784 |
| 6-171565 | * | 6/1994 | (JP) ........................................ | 29/824 |
| 6-285729 | | 10/1994 | (JP) . | |

* cited by examiner

*Primary Examiner*—David P. Bryant
(74) *Attorney, Agent, or Firm*—Arent Fox Kintner Plotkin & Kahn PLLC

(57) ABSTRACT

An automobile door assembly line is provided which comprises a conveyor arranged in substantially a straight line with a plurality of right door pallets and a plurality of left door pallets for carrying right and left doors respectively, alternatingly positioned on the conveyor. The right door pallets and the left door pallets face in opposite directions such that right and left doors therein face in opposite directions. Right door associate work positions are located on one side of the conveyor, and left door associate work positions are located on the other side of the conveyor. The right door associate work positions and left door associate work positions are located relative to one another such that the work positions correspond to alternatingly positioned right door pallets and left door pallets. Further, the right door associate work positions are located such that a right door associate can place parts on the interior side of a right door and observe the exterior side of the left door, and a left door associate work position is located such that a left door associate can place parts on the interior side of the left door and observe the exterior side of the right door.

9 Claims, 5 Drawing Sheets

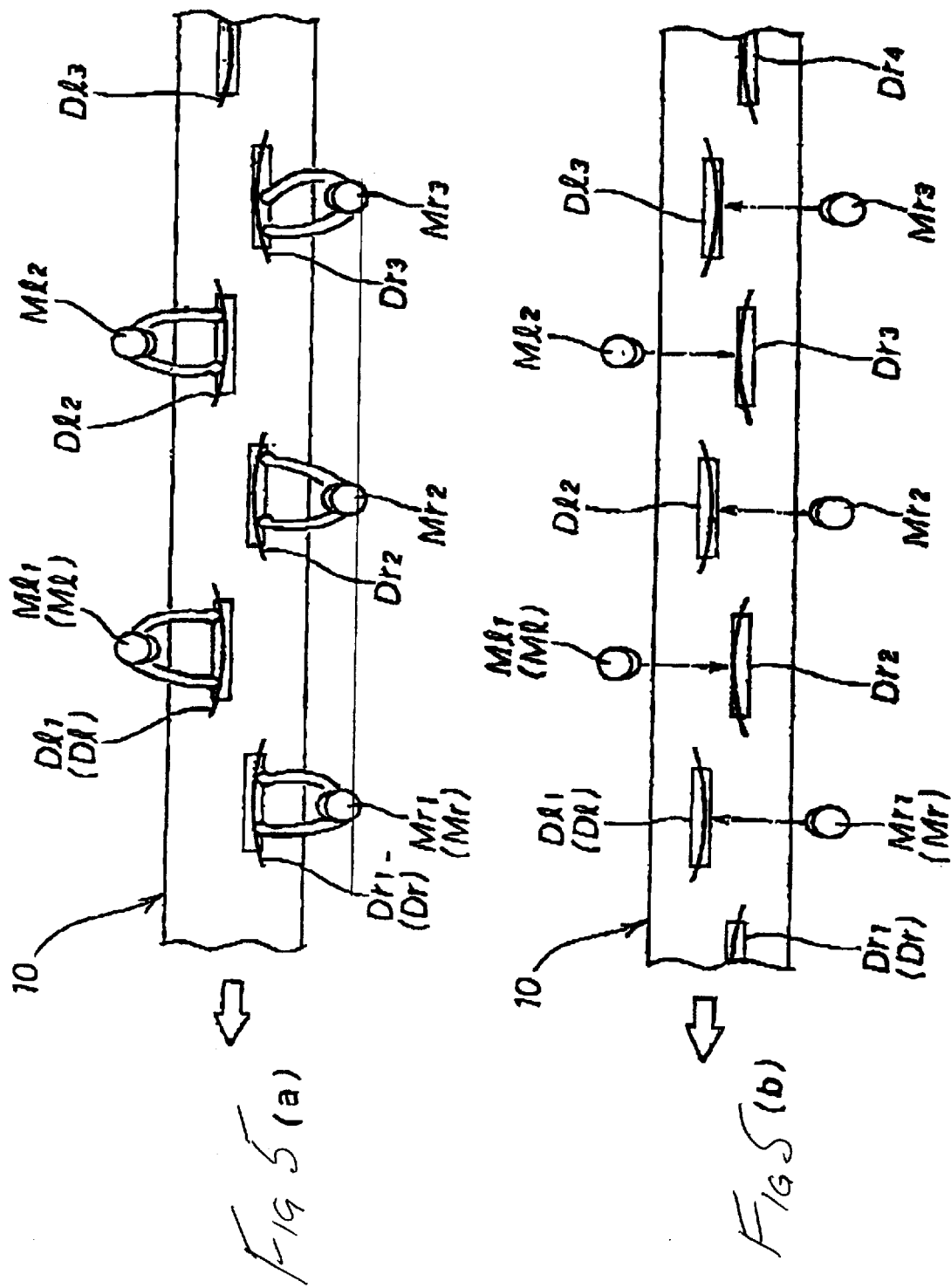

VEHICLE DOOR ASSEMBLY LINE

BACKGROUND OF THE INVENTION

1. Field of the Invention

The present invention is directed to a vehicle door assembly line, such as, for automobiles, for assembling corresponding left and right doors.

2. Description of the Prior Art

Prior art automobile manufacturing processes include left door and right door assembly lines where different parts, such as door moulding, window regulator, handle, and window glass, are installed in the proper order. In the prior art, the left door and right door are assembled on separate assembly lines. Thus two assembly lines are required. As a result, two conveyor systems are needed which double the space of a single conveyor system.

One prior art improvement is described in Japanese Laid-Open Publication No. 6-285729. In this prior art system, a carrier with left and right vertical frames is driven to travel along a rail. A horizontal support member pivotally movable about a vertical axis is mounted on each of the vertical frames so that the left and right doors can be set on the support members separately. The parts are installed in the doors as left door and right door are conveyed. In this prior art conveyor system, assembly workers standing on both right and left sides of the manufacturing line and are able to install parts on both the left and right doors simultaneously. Further, it is possible to turn both the left and right doors in a desired direction.

However, in this prior art pallet conveyor system, it is necessary to swing the right and left doors in the horizontal plane in order to assemble parts on both the interior and exterior sides of the left and right doors. Once the parts are assembled, the right and left doors are rotated or swung around to check the quality of the installation. This swinging operation reduces the work efficiency. Furthermore, it is necessary to provide adequate space to rotate around the left and right doors, and this requires an increase in the area required for the conveyor system.

SUMMARY OF THE INVENTION

It is the primary object of the present invention to improve the efficiency of the left and right door assembly line by reducing the work load of the associates and reducing the area required for the equipment.

In order to achieve the above object, the present invention is provided a vehicle assembly line comprising: a conveyer arranged to transport an alternating succession of left and right doors in a conveyance direction, the doors being arranged at a first pitch with the right doors and the left doors facing in opposite directions when viewed from above the assembly line; a succession of first work positions provided along one side of the conveyor at a second pitch which is twice as large as the first pitch; and a succession of second work positions provided along the other side of the conveyor also at the second pitch, but offset in the conveyance direction from the succession of first working positions so that the work positions are staggered with respect to a longitudinal centre line of the conveyor.

Thus, as the line moves along, an assembly worker on one of the first work positions will be presented with a repeated succession of left-door interior sides and right-door exterior sides, whereas an assembly worker on one of the second work positions will be presented with a repeated succession of left-door interior sides and right-door exterior sides, whereas an assembly worker on one of the second work positions will be presented with a repeated succession of left-door exterior sides and right-door interior sides. With this arrangement, it becomes possible to improve the working efficiency of workers assigned to right-door and left-door assembling work at the respective work positions by reducing the load on the workers, and to reduce the area required for the equipment.

Preferably, the vehicle door assembly line further includes an alternating succession of right door pallets and left door pallets aligned with the longitudinal centre line of the conveyor and adapted to be carried on the conveyor. Each of the right door pallets support one of the right doors and each of the left door pallets support one of the left doors. The right and left pallets have a length substantially the same as the first pitch. The first and second work positions have a length substantially the same as the length of the right and left door pallets.

The right and left door pallets may each include a front frame having at least one receiver for supporting one end of each of the right and left doors, and a rear frame having at least one receiver for supporting the other end of each of the right and left doors. One of the receiver of the front frame and the receiver of the rear frame is movably mounted on the associated frame via a slider such that the position of the one receiver can be adjusted in a direction parallel to the longitudinal centre line of the conveyor so as to enable the front and rear frames to support therebetween a right or a left door of a different size.

It is preferable that the right door pallets, while being carried on the conveyor, keep the right doors in alignment with the longitudinal centre line of the conveyor. The left door pallets, while being carried on the conveyor, keep the left doors in alignment with the longitudinal centre line of the conveyor.

Alternatively, the respective receivers of the front and rear frames of each of the right door pallets may be offset from the longitudinal centre line of the conveyor toward the one side of the conveyor, and the respective receivers of the front and rear frames of each of the left door pallets are offset from the longitudinal centre line of the conveyor toward the other side of the conveyor.

In one preferred embodiment of the invention, the right door pallets each support one of the right doors with its interior side facing in the same direction as the one side of the conveyor, and the left door pallets each support one of the left doors with its interior side facing in the same direction as the other side of the conveyor.

Each of the first work positions may preferably accommodate one assembly worker and enable the same worker to assemble door parts onto one right door when the right door is substantially in lateral alignment with the first work position and, thereafter, to perform visual inspection of the quality of the next following left door when the next following left door is substantially in lateral alignment with the first work position, and wherein each of the second work positions is sized and arranged to accommodate a second assembly worker and enable the second assembly worker to assemble door parts onto one left door when the left door is substantially in lateral alignment with the second work position and, thereafter, to perform visual inspection of the quality of the next following right door when the next following right door is substantially in lateral alignment with the second work position. The first work position is sized and arranged further to enable the one assembly worker to perform partial assembling work on the next following left door, and the second work position is sized and arranged further to enable the second assembly worker to perform partial assembly work on the next following right door.

BRIEF DESCRIPTION OF THE DRAWINGS

FIGS. 5(a) and 5(b) are used for explaining the operation of the present invention.

DETAILED DESCRIPTION OF THE PREFERRED EMBODIMENT

Figure 1:
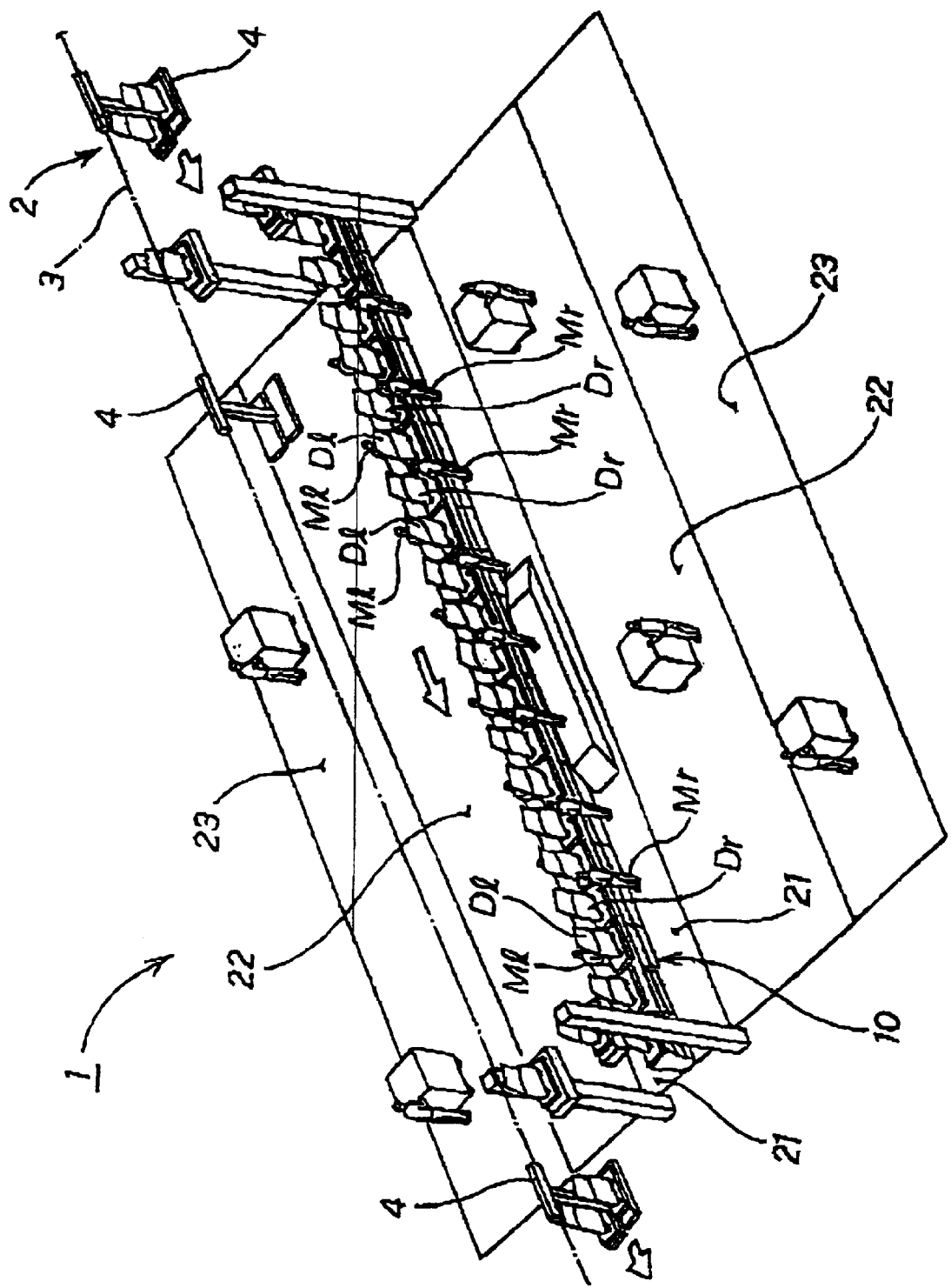
FIG. 1 is a perspective view of an automobile assembly line of the present invention.

Referring to FIG. 1, automobile door assembly line 1 includes an overhead conveyor 2 that transports the right doors DR and the left doors DL from a prior parts assembly in the direction indicated by the arrows. After completion of the door assembly, the right door DR and the left door DL are transported to the next process in the automobile assembly by means of overhead conveyor 2.

The automobile door assembly line 1 comprises a conveyor 10 arranged in a straight line with work areas 21 provided on both sides of the conveyor 10 for the assembly workers, who are referred to as associates in the following. Stock areas 22 are located to the sides of the work areas 21. Further, on the sides of the parts stock areas 22, are parts delivery routes 23.

Figure 2:
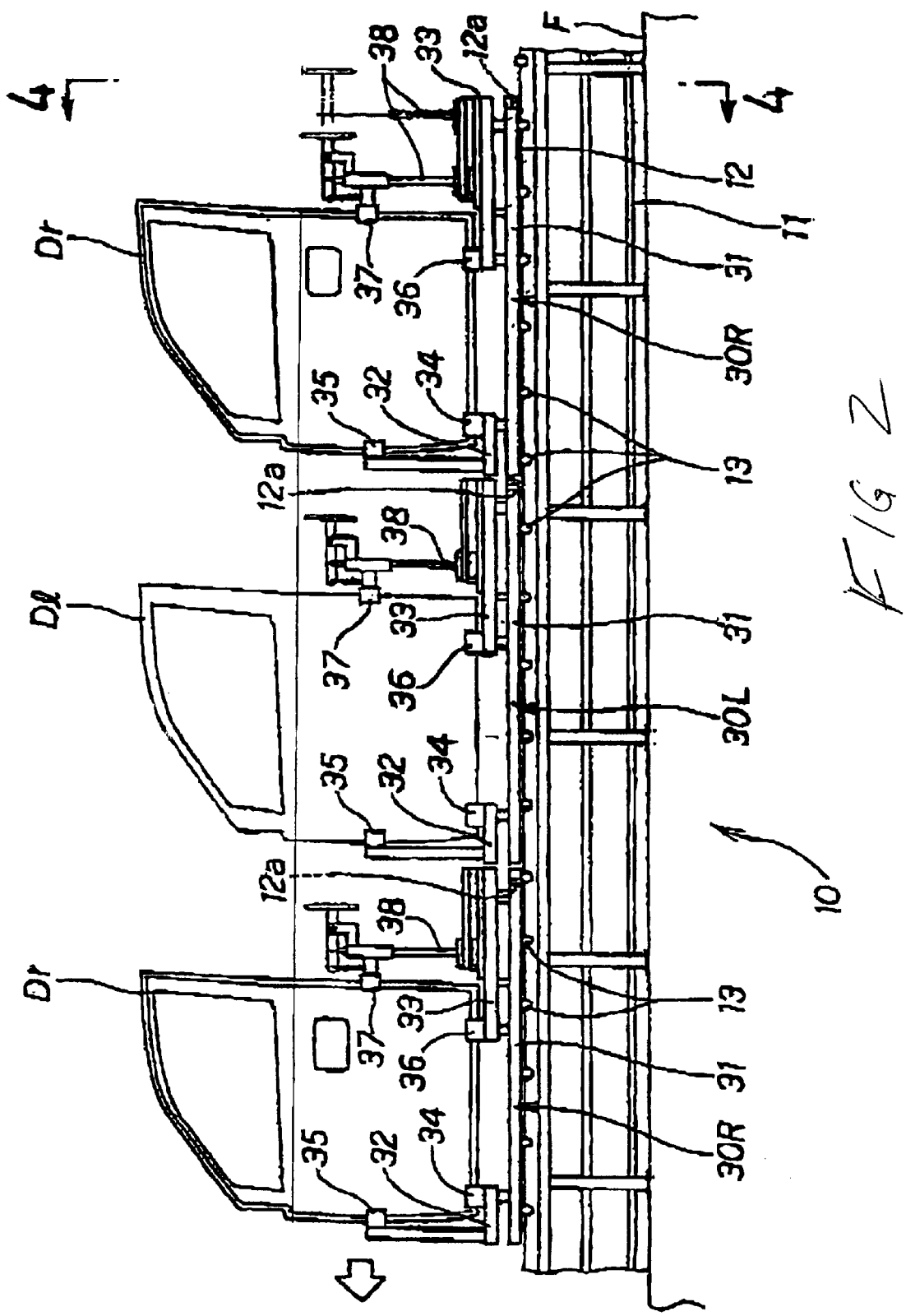
FIG. 2 is a side view of a portion of the conveyor of the present invention.

The overhead conveyor 2 is suspended from overhead and includes a rail 3 built to carry a motorized carrier 4. Referring to FIG. 2, the conveyor 10 comprises a long thin base 11 installed on a floor F. A sprocket, not shown, is positioned on both sides of the base 11 and a closed-loop chain 12 runs between the sprocket and the top of base 11 in the longitudinal direction with multiple guide rollers 13, to form a motorized chain conveyor. The chain 12 transports right door pallet 30R and left door pallet 30L in alternating fashion.

Each right door pallet 30R is used for setting one right door DR vertically with the front end or the rear end of the right door DR facing in the direction of conveyance of the conveyor 10. Similarly, each left door pallet 30L is used for setting one left door DL vertically with the front end or the rear end of the left door DL facing in the direction of conveyance of the conveyor 10.

The right door pallet 30R comprises guide rollers 13 that carry a mounting plate 31. A front frame 32 and a rear frame 33 are installed on top of the mounting plate 31. A front lower receiver 34 and a front upper receiver 35 are installed on the front frame 32. A rear lower receiver 36 and a rear upper receiver 37 are installed on the rear frame 33. The front lower receiver 34 supports the front lower end of right door DR as viewed in the conveyance direction. The front upper receiver 35 supports the front middle end of the right door DR as viewed in the conveyance direction. The rear lower receiver 36 supports the rear lower end of right door DR as viewed in the conveyance direction. The rear upper receiver 37 supports the rear middle area of the right door DR as viewed in the conveyance direction. The rear upper receiver 37 is installed on the rear door frame 33 with a slider 38 making it possible to move the door with the door holding position, so that right doors DR of different width in the carrier direction can be held. The structure of the left door pallet 30L is the same as that of the right door pallet 30R, and therefore a detailed explanation thereof is omitted.

Figure 3:
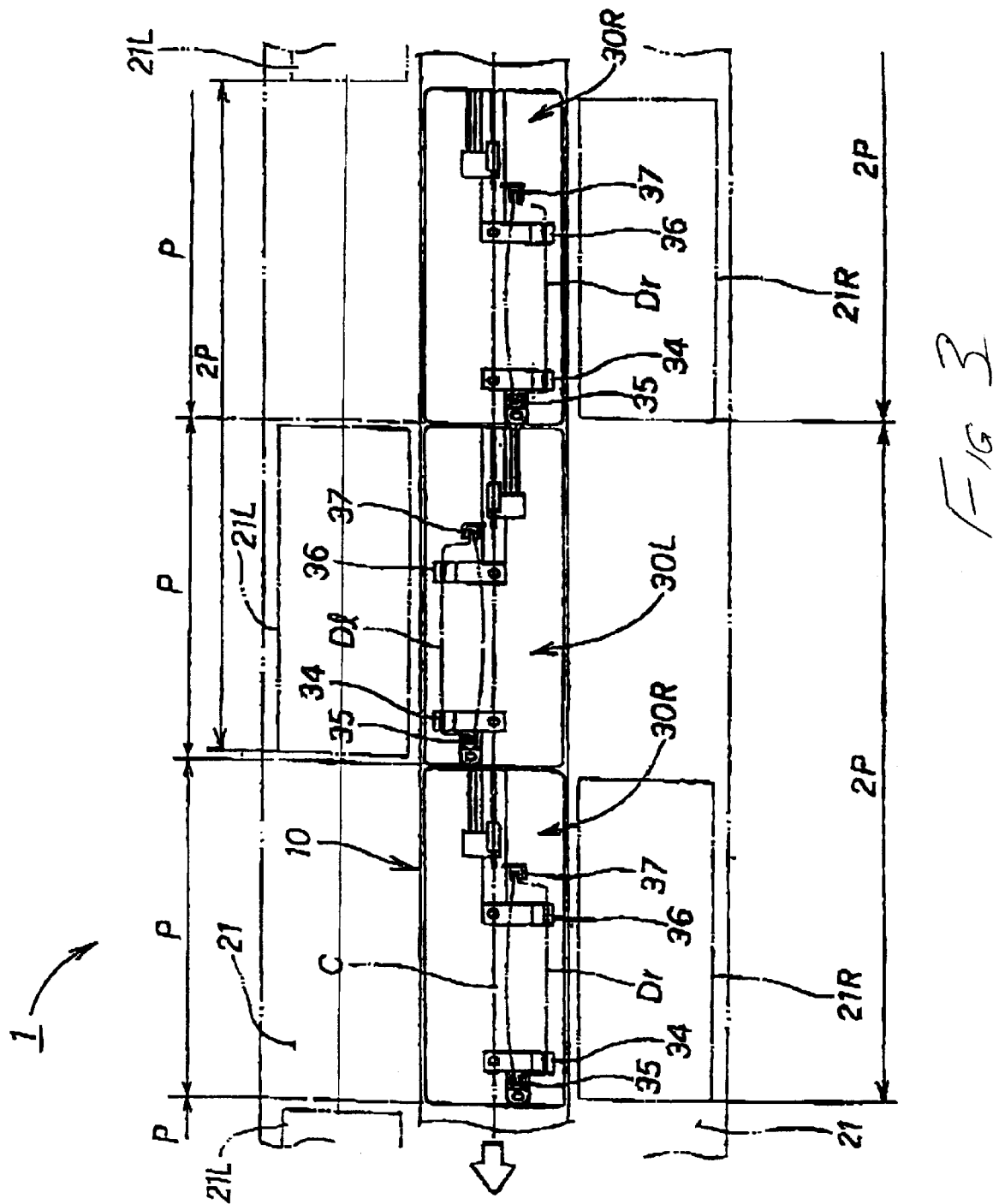
FIG. 3 is a plan view thereof.

Referring to FIG. 3, work areas 21 are located on either side of the conveyor 10 (the upper and lower parts of FIG. 3). In the upper work area 21, work positions 21L for the left door associates are provided spaced apart in the conveyance direction by a predetermined pitch 2P. On the other side of the conveyor's longitudinal centre line C, in the lower work area, corresponding work positions 21R are provided, also at a pitch 2P.

As shown in FIG. 3, the right door pallets 30R and the left door pallets 30L are alternately carried on the conveyor 10 at a uniform pitch P, which is half the length of the pitch 2P of the working positions 21R, 21L.

The work positions 21L for the left-door associates and the work positions 21R for the right-door associates are arranged or staggered pattern with respect to the longitudinal centre line C of the conveyor 10.

In each of the right door pallets 30R, the front lower receiver 34, the front upper receiver 35, the rear lower receiver 36 and the rear upper receiver 37 are offset from the longitudinal centre line C of the conveyor 10 toward the working positions 21R for the right-door associates. Similarly, in each of the left door pallets 30L, the front lower receiver 34, the front upper receiver 35, the rear lower receiver 36 and the rear upper receiver 37 are offset from the longitudinal centre line C of the conveyor 10 toward the working positions 21L for the leftdoor associates. Thus, as illustrated in FIG. 3, the receivers 34–37 of the right door pallets 30R and the receivers 34–37 of the left door pallets 30L are arranged in a zigzag or staggered pattern with respect to the longitudinal centre line C of the conveyor 10.

With this arrangement, the right doors DR set on the right door pallets 30R are located closer to the working positions 21R for the right-door associates than to the working positions 21L for the left-door associates. Similarly, the left doors DL set on the left door pallets 30L are located closer to the working positions 21L for the left-door associates than to the working positions 21R for the right-door associates.

Thus, the conveyor 10 transports the right doors DR and the left doors DL in such a manner that the right doors DR and the left doors DL face in opposite directions and are arranged alternately in a zigzag or staggered pattern when viewed from above.

Figure 4:
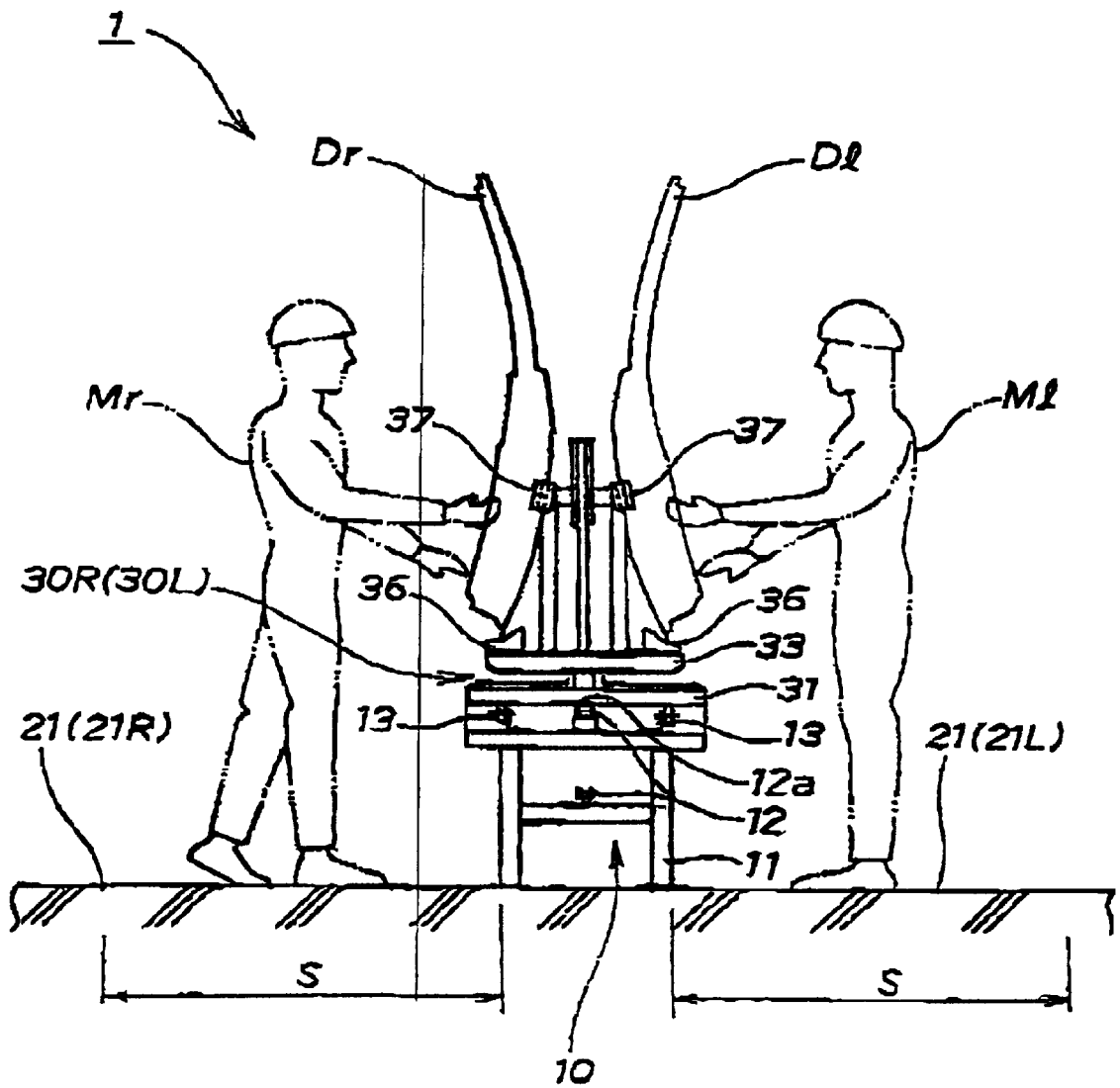
FIG. 4 is a cross-sectional view through line 4—4 in FIG. 2.

Referring to FIG. 4, which is a cross-section of FIG. 2 through line 4—4, there is shown a chain 12 extending along the longitudinal centre line C of the board 11. The guide rollers 13 are positioned on both sides of base 11, and the right and left door pallets 30R and 30L ride on the guide rollers. The right door DR is set on the right door pallet 30R with the interior side of the right door facing out. The left door DL is set on the left door pallet 30L with the interior side of the left door facing out. The conveyor 10 thus carries the right doors DR and the left doors DL in alternating succession with their interior sides facing out and the exterior sides facing towards each other.

The right door associates MR assemble the right doors DR from the right work positions 21R. The left door associates ML assemble the left doors DL from the left door associate work positions 21L.

The automobile door assembly line 1 does not require the rotating of the left and right doors in the horizontal plane, as in prior art assembly lines. Thus the dimension S of the work positions 21L and 21R can be reduced, resulting in a reduction of the required work areas 21.

Referring to FIG. 5(a), on one side of the conveyor 10, the left door associate ML is responsible for the left door DL and on the other side of the conveyor 10, the right door associate MR is responsible for the right door DR. The left door associate ML and the right door associate MR are positioned diagonally opposite from each other. The conveyor 10 carries the left door DL and the right door DR in an alternating fashion, with the doors facing in opposite directions, and the interior of the left door DL and the right door DR facing outward. The left door associate ML performs the left door assembly and the right door associate MR performs the right door assembly.

By moving the conveyor 10 along by a pitch P, the positions of the left and right doors DL and DR change to those shown in FIG. 5(b). In this position, the left door associate ML can observe and perform a visual inspection of the right door DR, or can perform an assembly operation on a portion of the right door DR. Further, the right door associate MR can observe and perform a visual inspection on the left door DL, or can perform part of the assembly operation of the left door DL. ongitudinal centre line of tin FIGS. 5(a) and 5(b), the plurality of left doors DL are designated DL 1, DL 2, DL 3 . . . , and the plurality of right doors DR are designated DR 1, DR 2, DR 3 . . . . The plurality of left door associates ML are designated ML 1, ML 2, ML 3 . . . , and the plural number of right door associates MR are designated MR 1, MR 2, MR 3 . . . .

As shown in FIG. 5(a), the first right door associate MR 1 installs different door parts, such as the door moulding, window regulator, handle, window glass, etc. from the interior side in the proper order for each model of automobile being assembled. Next, as shown in FIG. 5(b), the first right door associate MR 1 visually inspects the exterior side of the left door DL 1 to check whether the door parts have been properly installed. The second right door associate MR 2, installs different door parts to the right door DR 2 and also performs a visual inspection of the exterior side of the left door DL 2. The third right door associate MR 3 installs different door parts to the right door DR 3, and also performs a visual inspection of the exterior of the left door DL 3. Similar assembly and inspection functions can be performed by additional left and right door associates ML and MR. By performing the operation this way, the parts can be easily installed to the interior of the right door DR and the left door DL and the quality can also be easily checked.

In the present embodiment as shown in the drawings and as described above, the conveyor 10 carries the right door DR and the left door DL in alternating fashion facing in opposite directions with the doors being slightly, alternately, offset with respect to a straight line along the center line of the conveyor. The conveyor 10 can also carry the right door DR and the left door DL along a straight line rather than being slightly offset. Further, although conveyor 10 is described as a pallet chain conveyor, other types of conveyors, such as a flat top conveyor, can also be used.

In the present embodiment, the automobile door assembly line includes a conveyor which carries the left and right doors offset slightly from a straight line along the conveyor, with the left and right doors alternating and facing in opposite directions. On one side of the conveyor a left door associate is positioned, and a right door associate is positioned on the other side of the conveyor diagonally opposite from the left door associate. The left door associate is responsible for assembling the left door as well as observing to perform a visual inspection of the right door, and may also perform some of the assembly of the right door. The right door associate is responsible for assembling the right door as well as observing to visually inspecting the left door, and may also perform a partial assembly of the left door. As a result, it is not necessary to rotate the right and left doors in order to complete assembly, and after the parts have been installed to the interior and exterior, the quality can easily be checked. This reduces the work load of the associate and improves the work efficiency. Furthermore, the conveyor is only required to carry the left and right doors along the conveyance direction. Unlike the prior art described above, no means for swinging or rotation of the doors about a horizontal plane is required. The area required for the equipment can thus be reduced as compared to the prior art where it was necessary to rotate the doors.

Furthermore, by having an automobile assembly line with a conveyor in which the right and left doors are diagonally opposite to each other, the left door associate's work position is nearer to the left door and the right door associate's work position is nearer to the right door, thereby making it easier for the associates to assemble the door.

What is claimed is:

1. A vehicle door assembly line comprising:
  a conveyor arranged to transport an alternating succession of right doors and left doors in a conveyance direction, the right and left doors being arranged at a first pitch with the right doors facing an opposite direction relative to the left doors when viewed from above the conveyor;
  a succession of first work positions provided along one side of the conveyor at a second pitch that is twice as large as the first pitch; and
  a succession of second work positions provided along the other side of the conveyor at the second pitch, but offset in the conveyance direction from the succession of first work positions so that the first and second work positions are staggered with respect to a longitudinal centre line of the conveyor.

2. The vehicle door assembly line as set forth in claim 1, further comprising an alternating succession of right door pallets and left door pallets each aligned with the longitudinal centre line of the conveyor and adapted to be carried on the conveyor, each of the right door pallets support one of the right doors and each of the left door pallets support one of the left doors, the right and left pallets have a length substantially the same as the first pitch, and the first and second work positions have a length substantially the same as the length of the right and left door pallets.

3. The vehicle door assembly line as set forth in claim 2, wherein the right door pallets, while being carried on the conveyor, maintain the right doors in alignment with the longitudinal centre line of the conveyor, and the left door pallets, while being carried on the conveyor, maintain the left doors in alignment with the longitudinal centre line of the conveyor.

4. The vehicle door assembly line as set forth in claim 2, wherein the right door pallets each support one of the right doors with an interior side of the right doors facing in the same direction as the one side of the conveyor, and the left door pallets each support one of the left doors with an interior side of the left doors facing in the same direction as the other side of the conveyor.

5. The vehicle door assembly line as set forth in claim 2, wherein the right and left door pallets each further comprise a front frame having at least one receiver for supporting one end of each of the right and left doors, a rear frame having at least one receiver for supporting the other end of each of the right and left doors, wherein one of the receiver of the front frame and the receiver of the rear frame is movably mounted on the associated frame via a slider such that the position of the one receiver is adjustable in a direction parallel to the longitudinal centre line of the conveyor so as to enable the front and rear frames to support therebetween either one of a right or a left door of a different size.

6. The vehicle door assembly line as set forth in claim 5, wherein the respective receivers of the front and rear frames of each of the right door pallets are offset from the longitudinal centre line of the conveyor toward the one side of the conveyor, and the respective receivers of the front and rear frames of each of the left door pallets are offset from the longitudinal centre line of the conveyor toward the other side of the conveyor.

7. The vehicle door assembly line as set forth in claim 1, wherein each of the first working positions is sized and arranged to accommodate one assembly worker and enable the same worker to assemble door parts onto one right door when the right door is substantially in lateral alignment with the first work position and, thereafter, to perform visual inspection of the quality of the next following left door when the next following left door is substantially in lateral alignment with the first work position, and wherein each of the second work positions is sized and arranged to accommodate a second assembly worker and enable the second assembly worker to assemble door parts onto one left door when the left door is substantially in lateral alignment with the second work position and, thereafter, to perform visual inspection of the quality of the next following right door when the next following right door is substantially in lateral alignment with the second work position.

8. The vehicle door assembly line according to claim 7, wherein the first work position is sized and arranged further to enable the one assembly worker to perform partial assembling work on the next following left door, and the second work position is sized and arranged further to enable the second assembly worker to perform partial assembling work on the next following right door.

9. The vehicle door assembly line according to claim 1, wherein the offset of the second work positions relative to the first work positions is approximately equal to the first pitch so that each movement of the conveyor by a distance of the first pitch presents opposite sides of left and right doors to each of the first and second work positions in sequence.

* * * * *